(No Model.)
J. N. GOLDBACHER.
PNEUMATIC TIRE.
No. 526,185. Patented Sept. 18, 1894.
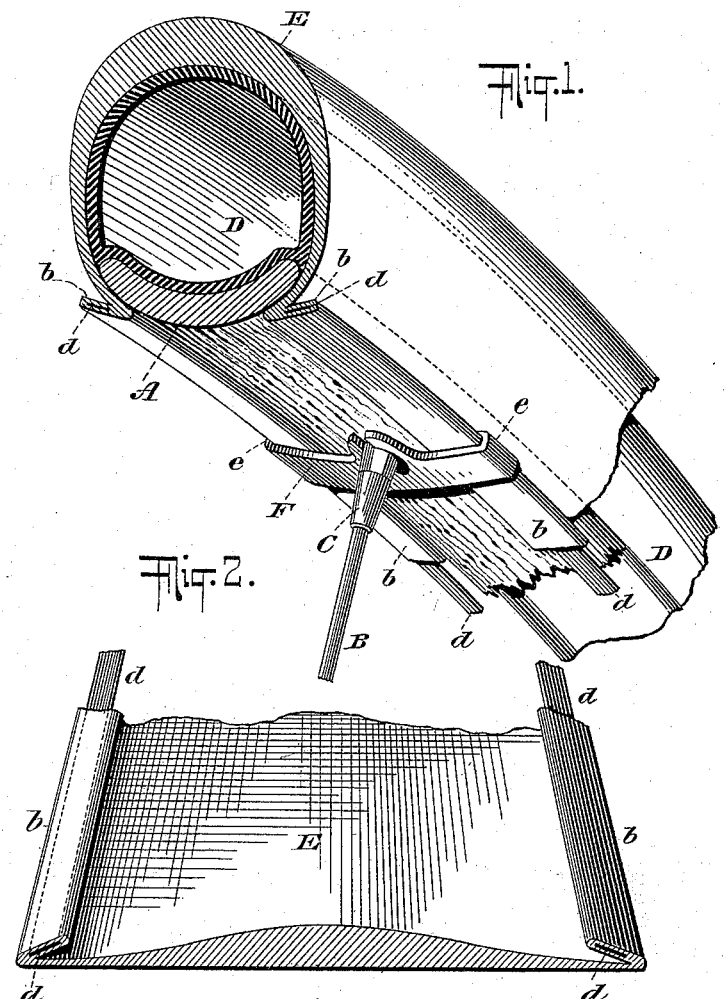
WITNESSES:
Gustave Dieterich
John Kehlenbeck
INVENTOR
Joseph N. Goldbacher,
BY
Chas. C. Gill
ATTORNEY.
THE NORRIS PETERS CO., PHOTO-LITHO., WASHINGTON, D. C.

UNITED STATES PATENT OFFICE.

JOSEPH N. GOLDBACHER, OF NEW YORK, N. Y.

PNEUMATIC TIRE.

SPECIFICATION forming part of Letters Patent No. 526,185, dated September 18, 1894.

Application filed December 6, 1893. Serial No. 492,897. (No model.)

*To all whom it may concern:*

Be it known that I, JOSEPH N. GOLDBACHER a citizen of the United States, and a resident of New York, in the county of New York and State of New York, have invented certain new and useful Improvements in Pneumatic Tires for Wheels, of which the following is a specification.

The invention relates to improvements in pneumatic tires for wheels and particularly for the wheels of bicycles; and the object of the invention is to produce a structure or tire adapted to be readily applied and secured to the wheel without the use of cement and without the necessity of providing special securing flanges or other means directly in the rim of the wheel.

A further object of the invention is to so construct the tire and means for securing the same to the rim of the wheel that in case of deflation by accident or otherwise, the securing means will not be subjected to the weight of the wheel or rider or both during the travel of the bicycle and hence will not become bent, distorted or destroyed, as is the case frequently with the specially flanged metal rims at the present time largely in use.

A further object of the invention is to provide a tire in which the parts may be quickly and with great convenience firmly applied to the rim without the use of special tools, and as quickly and conveniently removed from and replaced on the rim by the rider in case it should become necessary while on the road to remove the outer covering or shoe for the purpose of closing a puncture in the inflatable tube.

A further object of the invention is to furnish a pneumatic tire adapted to be applied to wheels having wooden rims and to be secured thereto by convenient external means located wholly at the inner exposed side of the rim and adapted to firmly clutch the edges of the outer covering or shoe.

With the foregoing objects in view, the invention consists essentially in a tire composed of the inflatable tube applied to the outer periphery of the rim, the shoe having shoulders at its side-edges and adapted to inclose the inflatable tube and a portion of the rim, and a series of clutches or analogous devices arranged at points along the inner side of the rim and adapted to firmly hold the side edges of the shoe against the rim.

The nature of the invention and the construction by which it may be carried into effect, will be more fully understood from the detailed description hereinafter presented, reference being had to the accompanying drawings, in which—

Figure 1 is a perspective view of a detached portion of a wheel constructed in accordance with and embodying the invention, the said figure also showing a vertical transverse section through the rim, tube and shoe. Fig. 2 is a perspective view of a portion of the shoe as it would appear if flattened out, the outline of the shoe as molded being substantially that shown in Fig. 1. Fig. 3 is a detached plan view of one of the clutches employed at the spoke-nipples for securing the shoe in position, and Fig. 4 is a like view of one of the clutches of a form which may be employed when desired at points intermediate the spoke nipples for securing the shoe in position.

In the drawings A designates the rim; B, the spoke; C, the spoke nipple, and D the inflatable tube, the parts all being of usual construction. The rim A shown in Fig. 1 is of wood and is the rim I prefer to use in carrying out my invention, although it is to be understood that I do not in every instance limit the invention to a wheel in which the rim is of wood.

The rubber shoe is denoted by the letter E, and at its side edges is provided with the shoulders or flanges *b* preferably containing the longitudinal stiffening strips or bands *d*, shown in Figs. 1 and 2, with their width in line with the width of said shoulders or flanges *b*. The shoe E is of sufficient width to extend over the tube D and lap upon the inner exposed side of the rim A, as indicated in Fig. 1. The clutches F for securing the edges of the shoe E and thus holding the shoe in position, will be applied at equidistant points along the inner side of the rim A, preferably at the spoke nipples C, about, say, six or eight of the clutches being used for the average wheel of a "safety." When the clutches F are to be used at the spoke nipples, they will preferably be of the form illustrated in Figs. 1 and 3, in which it will be observed that the clutch consists of a plate of metal, preferably steel, having its ends folded inward toward each other to form hooks $e, e$, and provided at its center with the aperture $f$ and slot $g$, the latter being sufficient in width to pass over the spoke B and the aperture $f$ having a diameter sufficient to receive the nipple C close to the inner side of the rim. When the clutches F are to be employed intermediate the spokes B, they may be of the form shown in Fig. 4, the slot $g$ and aperture $f$ not being, under such conditions, required.

In the construction of the tire in accordance with my invention the tube D is placed on the outer periphery of the rim A, and the shoe E then applied over said tube, the side edges of the shoe extending downward and under the inner periphery of the rim A, in which position they will be held by the clutches F, whose hooks $e$ will engage the flanges $b$ of said shoe. The clutches F will loosely hold the shoe E at first, but after the parts have been arranged on the rim A, the tube D will be inflated in the usual manner and its expansion will distend the shoe E and cause its side edge flanges $b$ to draw with great force against the hooks $e$, whereby the edges of the shoe will be closely and firmly held against the inner side of the rim A. When the clutches F are applied at the spoke nipples, as shown in Fig. 1, the nipples prevent any movement of the same either laterally or along the rim, and this is an advantage in that the uniform position of the shoe may be always quickly secured and the rider can feel assured that when the wheel is in use the tire can never move on or creep around the rim. The stiffening strips or bands aid in preventing the side edges of the shoe E from bulging outward from the rim A, and when used they impart such rigidity to the edges of the shoe and cause said edges to so closely bind against the inner exposed surface of the rim A that comparatively few of the clutches F need be employed for securing the shoe in position. I do not, however, in every instance, limit the invention to the use of the rigid stiffening strips or bands $d$, nor do I confine the invention to the form of said strips, nor to their particular location in the shoe E, whether in the flanges or shoulders $b$ or in the sides of the shoe adjacent to said flanges or in both said sides and said flanges.

The clutches F will preferably be made of spring steel, and in their initial condition will be slightly bowed so that the hooks $e, e$, will retain their hold on the flanges or shoulders $b$ as soon as their engagement therewith has been effected and before the tube D has been inflated, the parts being thus lightly held together preparatory to the inflation of the tube D, which, as above described, results in the firm attachment of the tire in position.

It will be observed that the tire constructed in accordance with my invention lacks the necessity for cement, and that the securing means are not constructed as a part of the rim A, and hence that to remove the tube and shoe it is only necessary to deflate the tube, thus loosening all the parts and permitting the flanges $b$ to be withdrawn from the hooks $e$. It will also be observed that in case the tire should be punctured, the weight of the wheel and rider would not come upon the means for securing the shoe, but would act upon the periphery of the rim, which, not being specially flanged to clutch the shoe, would not under ordinary circumstances be damaged.

The entire construction of the tire in accordance with my invention involves convenience and simplicity both to the manufacturer and user, and lightness, cheapness and durability, without detracting from efficiency, "life" or elasticity or desirability.

What I claim as my invention, and desire to secure by Letters Patent, is—

1. The pneumatic tire consisting of the rim, the inflatable tube applied on said rim, and the shoe having flanges along its edges and applied over said tube, combined with a series of independent removable transverse clutches external to and at the inner side of the rim and having their ends turned inward to form hooks engaging said flanges; substantially as set forth.

2. The pneumatic tire consisting of the rim, inflatable tube and shoe applied over the said tube and inner side of the rim and having along its edges the flanges, combined with a series of independent removable transverse clutches external to and at the inner side of the rim and having their ends turned inward toward the rim and forming hooks to engage said flanges; substantially as set forth.

3. The pneumatic tire consisting of the rim, inflatable tube and shoe applied over the said tube and inner side of the rim and having along its edges the stiffening bands and outwardly projecting flanges, combined with a series of independent removable transverse clutches external to and at the inner side of the rim and having their ends turned inward toward the rim and forming hooks to engage said flanges; substantially as set forth.

4. The pneumatic tire consisting of the rim, the inflatable tube thereon, and the shoe applied over the tube and inner side of the rim, combined with the series of transverse clutches at the inner side of the rim and having at their ends hooks to engage the shoe and at a point between their ends the aperture and slot; substantially as set forth.

Signed at New York, in the county of New York and State of New York, this 5th day of December, A. D. 1893.

JOSEPH N. GOLDBACHER.

Witnesses:
CHAS. C. GILL,
ED. D. MILLER.